W. M. CROW.
FINGER BOARD FOR VIOLINS AND THE LIKE.
APPLICATION FILED JUNE 4, 1915.

1,237,872.

Patented Aug. 21, 1917.

WITNESSES:

INVENTOR
Walter M Crow
BY
ATTORNEY

UNITED STATES PATENT OFFICE.

WALTER M. CROW, OF SPENCER, INDIANA.

FINGER-BOARD FOR VIOLINS AND THE LIKE.

1,237,872.  Specification of Letters Patent.  Patented Aug. 21, 1917.

Application filed June 4, 1915. Serial No. 32,133.

*To all whom it may concern:*

Be it known that I, WALTER M. CROW, a citizen of the United States, and a resident of Spencer, county of Owen, and State of Indiana, have invented a certain new and useful Finger-Board for Violins and the like; and I do hereby declare that the following is a full, clear, and exact description thereof, reference being had to the accompanying drawings, in which like letters refer to like parts.

This invention relates to the construction of finger boards for violins and like instruments so as to enable the player of a violin to properly finger the board while at the same time permitting the higher positions to be played free from the interference of the frets.

The main feature of the invention consists of frets supplied on the outer portion of the finger board next to the head of the instrument so as to guide the movement of the fingers, while the inner portion of the finger board or that part next to the body of the instrument will be plain to permit the more accurate fingering in the higher positions. To accomplish this improvement and still retain accurate tone the plain portion of the finger board is raised so that its surface will be substantially on the same level as the top of the frets so that when the string is pressed down by the finger it will engage either the top of the frets or the surface of the plain portion of the finger board which being on the same level will not change the tension of the strings and therefore, not affect the tone of the instrument in changing from the fretted portion to the plain portion of the finger board.

Figure 1:
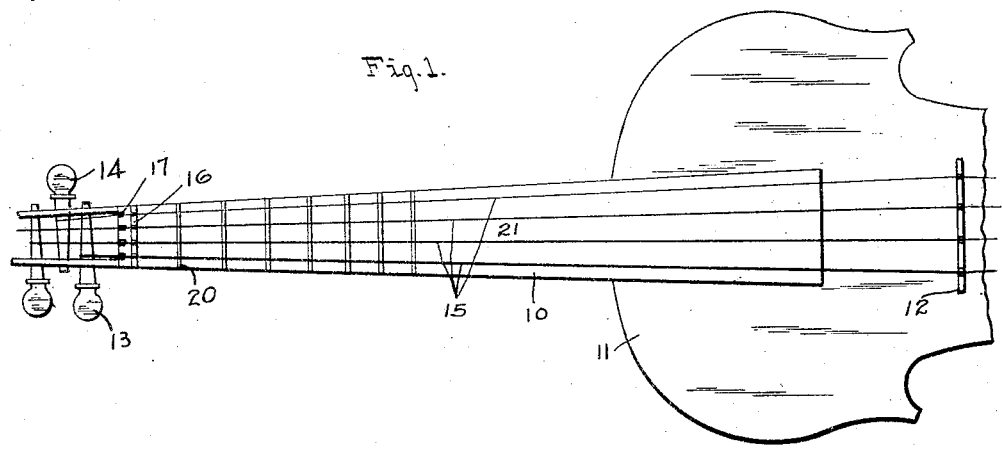
Figure 2:
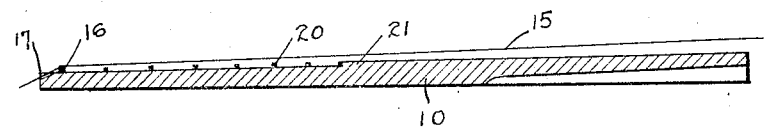
Figure 3:
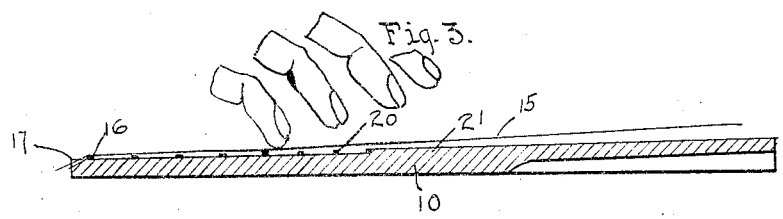
Figure 4:
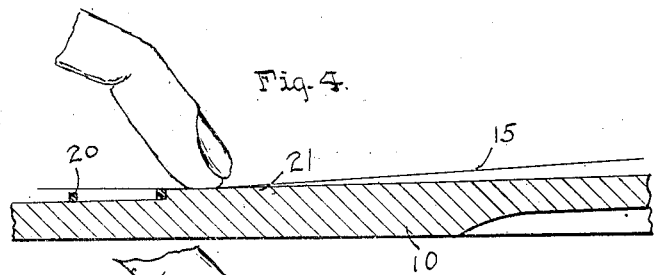
Figure 5:
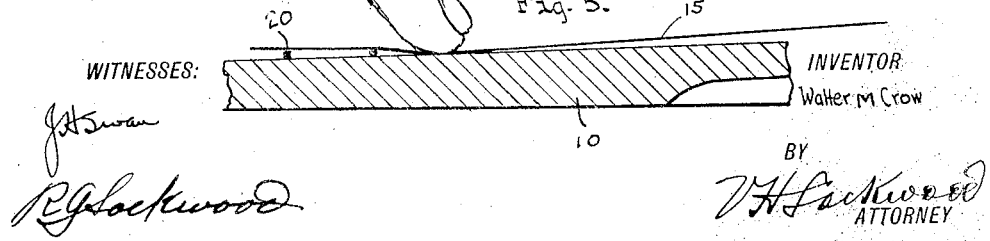

The full nature of my invention will be understood from the accompanying drawings and the following description and claim:

In the drawings Figure 1 is a plan view of the finger board of a violin with associated parts partly broken away. Fig. 2 is a central vertical section through the finger board on the same scale as in Fig. 1. Fig. 3 is the same as Fig. 2 showing one of the violin strings pressed down on a fret. Fig. 4 is a portion of the finger board as shown in Fig. 2 but on a larger scale and showing the position of the string when it is depressed above the upper fret. Fig. 5 is a similar section of a finger board as heretofore made with frets and a string held down above the frets.

In detail there is shown herein a finger board 10 of usual shape mounted on the body 11 of a violin, which carries a bridge 12 and a neck 13 and pegs 14 of usual type. There is nothing peculiar in the foregoing parts nor in the strings 15. There is a notched nut 16 near the small end of the finger board for holding the strings from lateral displacement and the strings curve therefrom over the small end of the finger board and lie in notches at 17 so that a sharp curve of the string is avoided. The portion of the finger board next to the pegs is provided with a series of frets 20, there being seven of them, which is as many as the instrument should have, as more frets would interfere with the proper accuracy of the instrument. The remainder of the finger board has an elevated surface 21 on a higher level than the surface of the portion of the finger board which contains the frets 20 and this higher level 21 continues from the highest fret to the upper end of the finger board. The higher surfaced portion of the finger board is on substantially the same level as the upper edges of the frets.

With the seven frets shown, accurate tones can be obtained, and when a string is depressed on a fret, as shown in Fig. 3, said string remains clearly out of contact with the elevated or higher portion of the finger board.

It is thus seen, that in a broad sense, I have succeeded in combining in one finger board portions from the two well known types of finger boards, the fretted and plain types. I use the fretted portion of the finger board within the range of accuracy possible for the usual fretted finger board, and above that or out of the range of accuracy I use the plain board, but I overcome the inaccuracy and defects arising from the partially fretted finger board by having the surface of the plain portion of the finger board on a higher level than the fretted portion and on substantially the same level as the top edges of the frets.

In Fig. 5, I have illustrated the position of the string when depressed on the surface of a finger board above the last fret, which surface is on the same level as the fretted portion of the finger board.

It will be observed that the finger there causes a very considerable depression of the string, forcing it very perceptibly out of its normal position, and therefore increasing its relative tension so that a very different tone will result as compared with the tone that would come from a string similarly held against the finger board where the surface is elevated as shown in Fig. 4.

The invention claimed is:

A violin or like musical instrument including a finger board having its outer portion next to the pegs at a lower level than the inner portion thereof, frets on said outer portion projecting up to the level of the inner portion, and the surface of the inner portion being substantially in line with the top of the frets.

In witness whereof, I have hereunto affixed my signature in the presence of the witnesses herein named.

WALTER M. CROW.

Witnesses:
R. G. LOCKWOOD,
MABEL HEINOLD.

Copies of this patent may be obtained for five cents each, by addressing the "Commissioner of Patents, Washington, D. C."